United States Patent
Van Brink et al.

(10) Patent No.: US 9,699,199 B2
(45) Date of Patent: Jul. 4, 2017

(54) MEDIA STREAM TRUST DISPLAY

(71) Applicant: Microsoft Technology Licensing, LLC, Redmond, WA (US)

(72) Inventors: David Arthur Van Brink, Santa Cruz, CA (US); Martin Wyville Thomson, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/236,151

(22) Filed: Aug. 12, 2016

(65) Prior Publication Data
US 2016/0352758 A1    Dec. 1, 2016

Related U.S. Application Data

(62) Division of application No. 14/158,355, filed on Jan. 17, 2014, now Pat. No. 9,450,968.

(51) Int. Cl.
*H04L 29/06*     (2006.01)
*G06F 3/0481*    (2013.01)
(Continued)

(52) U.S. Cl.
CPC ............ *H04L 63/14* (2013.01); *G06F 3/0482* (2013.01); *G06F 3/04817* (2013.01);
(Continued)

(58) Field of Classification Search
CPC ... H04L 63/126; H04L 63/14; H04L 63/1433; H04L 63/1441; H04L 63/1483;
(Continued)

(56) References Cited

U.S. PATENT DOCUMENTS 6,092,194 A    7/2000   Touboul
8,176,542 B2   5/2012   Lawrence et al.
(Continued)

FOREIGN PATENT DOCUMENTS

EP          2017758          1/2009

OTHER PUBLICATIONS

"International Preliminary Report on Patentability", Application No. PCT/US2015/010942, Mar. 10, 2016, 7 pages.
(Continued)

*Primary Examiner* — Minh Dinh

(57) ABSTRACT

Media stream trust display techniques are described in which trust information regarding content elements is accessible on an individual element basis. In particular, composite content having various content elements is rendered via a user interface of a browser or other application that supports web-based communications. Trust data is then obtained for the content elements on an individual basis in accordance with a trust model implemented by the application that facilitates retrieval of trust assertions for individual content elements. The user interface may be configured to display trust data using separate elements to represent trust data for different content elements. The display of trust data may include previews of content elements, such as thumbnail images and/or live media tiles for media streams. Additionally, a thumbnail view of a composite page/document may be provided that has selectable representations of content elements through which a user may access corresponding trust data.

20 Claims, 9 Drawing Sheets

(51) Int. Cl.
G06F 3/0482 (2013.01)
G06F 21/64 (2013.01)

(52) U.S. Cl.
CPC .......... *G06F 21/64* (2013.01); *H04L 63/126* (2013.01); *H04L 65/403* (2013.01); *G06F 2221/2119* (2013.01)

(58) Field of Classification Search
CPC .......... G06F 21/64; G06F 2221/2119; G06F 3/04817; G06F 3/0482; G06F 17/30849
See application file for complete search history.

(56) References Cited

U.S. PATENT DOCUMENTS

| | | |
|---|---|---|
| 9,450,968 B2 | 9/2016 | Van Brink et al. |
| 2004/0030784 A1 | 2/2004 | Abdulhayoglu |
| 2008/0303689 A1 | 12/2008 | Iverson |
| 2013/0018848 A1 | 1/2013 | Velasco |
| 2015/0207804 A1 | 7/2015 | Van Brink et al. |

OTHER PUBLICATIONS

"International Search Report and Written Opinion", Application No. PCT/US2015/010942, Mar. 24, 2015, 8 pages.

"Non-Final Office Action", U.S. Appl. No. 14/158,355, Nov. 19, 2015, 6 pages.

"Notice of Allowance", U.S. Appl. No. 14/158,355, May 19, 2016, 5 pages.

"Restriction Requirement", U.S. Appl. No. 14/158,355, Oct. 8, 2015, 6 pages.

"Second Written Opinion", Application No. PCT/US2015/010942, Dec. 14, 2015, 6 pages.

Asuncion,"SourceTrac: Tracing Data Sources within Spreadsheets", Available at <http://faculty.washington.edu/hazeline/Asuncion_IPAW.pdf>, Jun. 2012, 14 Pages.

Beauxis-Aussalet,"A Case Study of Trust Issues in Scientific Video Collections", In Proceedings of MAED 2013, Oct. 22, 2013, 6 Pages.

Freitas,"W3P: Building an OPM Based Provenance Model for the Web", Future Generation Computer Systems 27, Oct. 26, 2010, pp. 766-774.

Gehani,"VEIL: A System for Certifying Video Provenance", In Proceedings of the 9th IEEE International Symposium on Multimedia, Dec. 2007, 10 Pages.

Groth,"ProvenanceJS: Revealing the Provenance of Web Pages", Provenance and Annotation of Data and Processes, Lecture Notes in Computer Science vol. 6378, Jun. 2012, pp. 283-285.

Groth,"Requirements for Provenance on the Web", International Journal of Digital Curation, vol. 7, No. 1, Apr. 2012, 18 Pages.

Kaufman,"Client Security User Interface Requirements for RTCWEB", Available at <http://tools.ietf.org/html/draft-kaufman-rtcweb-security-ui-00>, Jun. 30, 2011, 5 Pages.

Rescorla,"Security Considerations for WebRTC", draft-ietf-rtcweb-security-05, Jul. 15, 2013, 24 pages.

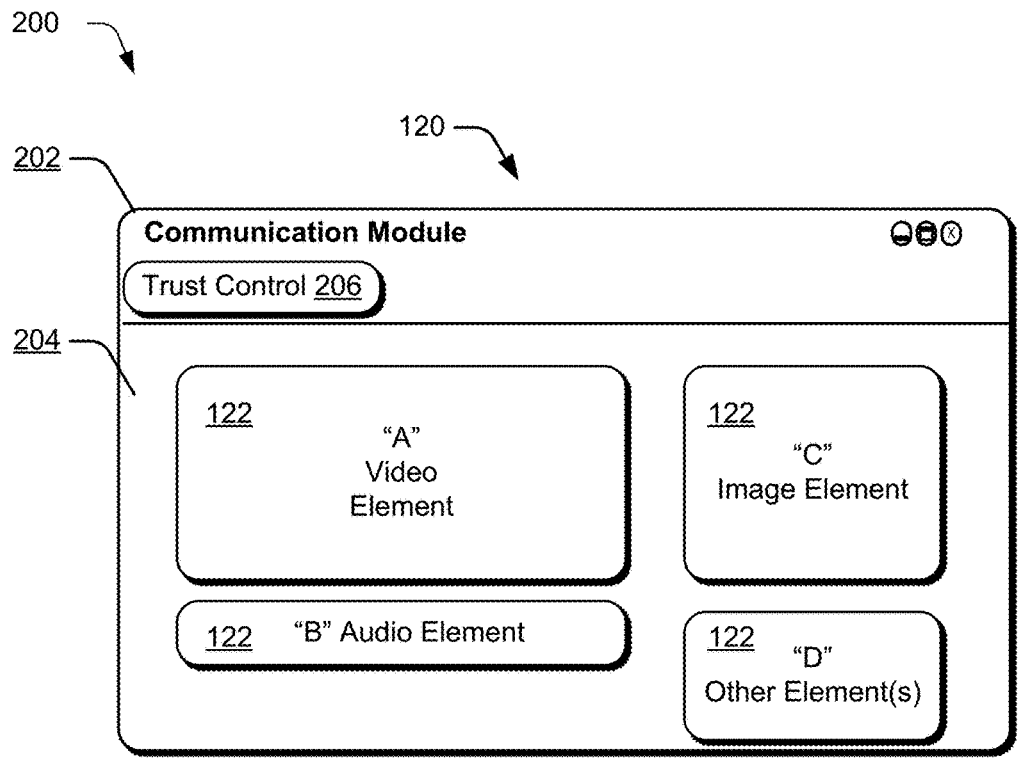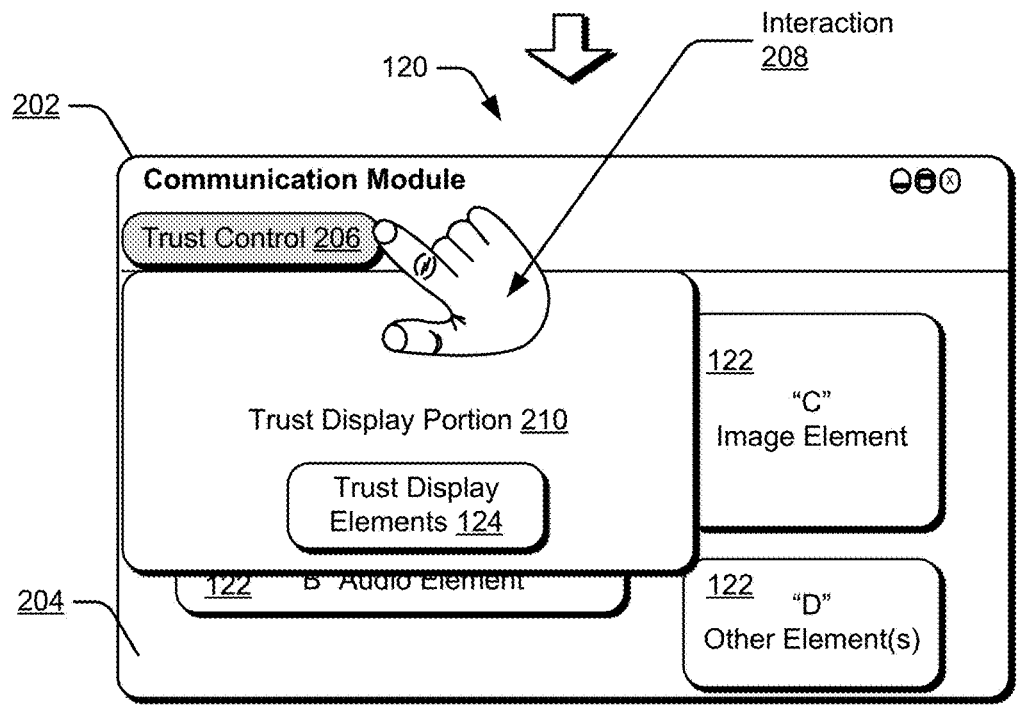
Fig. 2

MEDIA STREAM TRUST DISPLAY

RELATED APPLICATIONS

This application is a divisional of and claims priority to U.S. patent application Ser. No. 14/158,355 filed Jan. 17, 2014 entitled "Media Stream Trust Display", the disclosure of which is incorporated by reference herein in its entirety.

BACKGROUND

Users are increasingly relying upon web-based resources for conducting business and personal communications including online meetings, screen-sharing, video chats, messaging, and otherwise communicating via the Internet. Some web-based communications may involve exchange of video and/or audio streams, e.g., media streams, and/or other embedded content elements via a browser or other web enabled application. Generally, users want to be informed regarding the authenticity of content to verify assertions that the content actually originates from a particular source and/or to make sure interaction with the content is safe. Although existing techniques may establish trust information regarding a web page, domain, or document as a whole, trust information may not be available or readily accessible for media streams and other content elements contained within the page. Accordingly, although existing techniques may provide an indication of trust for an entire page or domain, it can be difficult or impossible for users to get information regarding the authenticity of individual elements that are embedded within rendered content.

SUMMARY

Media stream trust display techniques are described in which trust information regarding content elements is accessible on an individual element basis. In particular, composite content made up of various content elements may be rendered in a content display portion of a user interface for an application that supports web-based communications. Trust data is then obtained for the content elements on an individual basis in accordance with a trust model implemented by the application. The trust model facilitates retrieval of certificates and/or other trust assertions for individual content elements including any media streams embedded in the composite content. A trust display portion provided by the user interface may be configured to present trust data using separate elements to represent trust data for different content elements. Further, the trust display portion may include previews of content elements, such as thumbnail images and/or live media tiles, or full rendition preview views for media streams. Additionally, the trust display portion may be configured to provide a thumbnail view or map of a composite page/document having selectable representations of the various content elements through which a user may access corresponding trust data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

FIG. 2 is a diagram depicting some details of a user interface to display trust for content in accordance with one or more implementations.

DETAILED DESCRIPTION

Overview

Existing techniques for informing users regarding trustworthiness of web documents generally are limited to establishing trust information regarding a web page, domain, or document as a whole. Unfortunately, trust information for individual content elements may not be available or readily accessible using theses traditional techniques. Accordingly, it can be difficult or impossible for users to get information regarding the authenticity of individual elements that are embedded within rendered content.

Media stream trust display techniques are described in which trust information regarding content elements is accessible on an individual element basis. In particular, composite content made up of various content elements may be rendered in a content display portion of a user interface for an application that supports web-based communications. Trust data is then obtained for the content elements on an individual basis in accordance with a trust model implemented by the application. The trust model facilitates retrieval of certificates and/or other trust assertions for individual content elements including any media streams embedded in the composite content. A trust display portion provided by the user interface may be configured to present trust data using separate elements to represent trust data for different content elements. Further, the trust display portion may include previews of content elements, such as thumbnail images and/or live media tiles, or full rendition preview views for media streams. Additionally, the trust display portion may be configured to provide a thumbnail view of a composite page/document having selectable representations of the various content elements through which a user may access corresponding trust data.

In the following discussion, an example environment is first described that may employ the techniques described herein. Example details and procedures are then described which may be implemented in the example environment as well as other environments. Consequently, the example details and procedures are not limited to the example environment and the example environment is not limited to the example details and procedures. Lastly, an example system and components of the system are discussed that may be employed to implement aspects of the techniques described herein.

Example Environment

Figure 1:
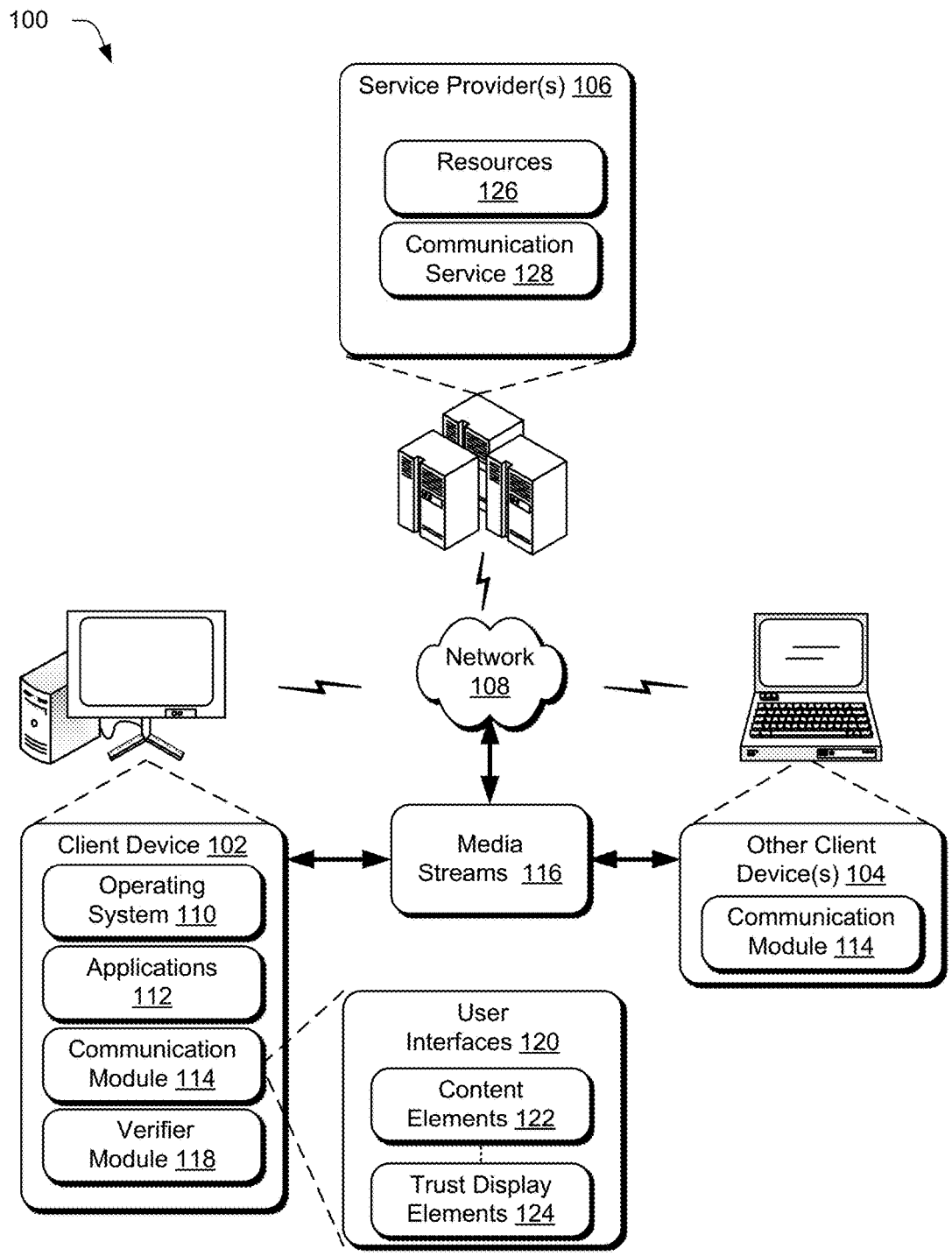
FIG. 1 is an illustration of an example operating environment that is operable to employ techniques for media stream trust display.

FIG. 1 is an illustration of an environment 100 in an example implementation that is operable to employ techniques described herein. The illustrated environment 100 includes a client device 102, an other client device 104, and a service provider 106 that are communicatively coupled via a network 108. The client device 102, other client device 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 9.

Although the network 108 is illustrated as the Internet, the network may assume a wide variety of configurations. For example, the network 108 may include a wide area network (WAN), a local area network (LAN), a wireless network, a public telephone network, an intranet, a peer-to-peer network, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with client devices are contemplated including, but not limited to, a productivity suite that integrates multiple office productivity modules, a web browser, games, a multi-media player, a word processor, a spreadsheet program, a photo manager, and so forth.

The client device 102 and other client device 104 are each illustrated as including a communication module 114. The communication modules are representative of functionality to enable various kinds of communications via the network 108. Examples of the communication modules include a browser to access web content, a voice communication application (e.g., a VoIP client), a video communication application, a messaging application, a content sharing application, and combinations thereof. The communication module 114 for instance, enables different communication modalities to be combined to provide diverse communication scenarios. This includes but is not limited to implementing integrated functionality for web browsing, user presence indications, video communications, online collaboration and meeting experiences, instant messaging (IM), and voice calling. Further, the communication module may be operable to access online resources (e.g., content and services), browse web pages and sites, establish communication connections with service providers and other clients, and so forth. In at least some implementations, the communication module 114 represents an application that is deployed to and installed locally on a client device. Additionally or alternatively, the communication module 114 may be implemented all or in part as a remote application that is accessed and executed via a web browser (e.g., a web application), as a remote service from a provider, using peer-to-peer techniques, and so forth.

In accordance with techniques described herein, the communication module 114 may enable sending and receiving of streaming audio and/or video between endpoints such as between a service provider and one or more clients and/or directly between clients. For example, exchange of various media streams 116 between endpoints is represented in FIG. 1. In one or implementations, media streams 116 represent web-based real-time communication that occurs using communication modules 114 that are configured as web browsers. Generally, the media streams 116 that are conveyed on a transport between two endpoints may be encrypted and signed in accordance with a trust model implemented by the web browsers (or other application 112 employed for interaction with media streams). By way of example and not limitation, the trust model may utilize a cryptographic protocol that relies upon digital certificates to convey trust data regarding entities that provide web-based resources. Communication security provided using various cryptographic protocols may be extended in the manner described herein to convey trust data for individual media streams and content elements of composite content. For instance, techniques described herein may employ various versions of Transport Layer Security (TLS) and Secure Sockets Layer (SSL). The trust model may be a certificate-based model in which X.509 certificates or other digital certificates are used to provide trust data that enables verification of content. Other trust models that use embedded metadata fields or other constructs to carry trust data and/or third-party services to disseminate trust data are also contemplated. More generally, any suitable trust verification scheme may be used to supply underlying trust data in association with individual content elements, which in turn may be employed to provide individual representations of trust for media streams and content elements as discussed herein.

For instance, the client device 102 may include a verifier module 118 configured to implement techniques for media stream trust display as described herein. As illustrated, the verifier module 118 may be provided as a standalone module that various applications 112 may make use of to verify authenticity of media streams 116 as described herein. In addition or alternatively, the image verifier module 118 may be implemented as a component of another application, such as being an integrated component of a browser or other communication module 114.

As further represented in FIG. 1, a user interface 120 may be output via a communication module 114 to render a view of composite content (e.g., a web page or web document that includes a plurality of content elements 122(e.g., image files, media streams, etc.) The verifier module 118 may be configured to make queries to obtain trust data associated with rendered content elements 122 from a designated source of trust data. The verifier module 118 further represents functionality operable to configure corresponding trust display elements 124 that enable access to the trust data via the user interface 120. In one or more implementations, the trust model may be deeply embedded with the communication module 114, in which case the verifier module 118 may interact directly with the communication module 114 to obtain trust data. In addition or alternatively, the verifier module 118 may access trust data by querying a content server through which the content is accessed, a web-accessible authentication service, or other designated source of trust data. Further details regarding techniques to obtain and utilize trust data for individual content elements are discussed in relation to the following figures.

The service provider 106 as depicted in FIG. 1 includes functionality operable to manage various resources 126 that may be made available over the network 108. For example, the service provider 106 may provide various resources 126 via webpages or other user interfaces that are communicated over the network for output by one or more clients via a web browser or other client application. The service provider 106 is configured to manage access to the resources 126, performance of the resources, and configuration of user interfaces to provide the resources 126, and so on. The service provider 106 may represent one or more server devices used to provide the various resources 126.

Generally, resources 126 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 126. Content may include various combinations of text, multi-media streams, documents, application files, photos, audio/video files animations, images, web pages, web applications, device applications, content for display by a browser or other client application, and the like.

One particular example of a resource that may be accessible via the service provider is a communication service 128 as represented in FIG. 1. The communication service 128 is representative of a service to perform various tasks for management of communications between the client device 102 and other client device 104. The communication service 128, for instance, may be operable to manage initiation, moderation, and termination of communication sessions for the clients. The communication service 128 may integrate functionality for one or more of VoIP calls, online meeting and conferencing, screen sharing, a unified communications and collaboration (UC&C) service, instant messaging, video chats, and so forth. The communication service 128 may also be implemented as or be connected to a private branch exchange (PBX) in communication with a Public Switched Telephone Network ("PSTN") to enable voice communication between the client terminal and other devices. The communication service 128 also represents functionality to implement aspects of techniques for image sharing during online collaborations as discussed above and below.

Having considered the foregoing example environment and details, consider now a discussion of some further details of techniques for media stream trust display in accordance with one or more implementations.

Example Trust Display Details and User Interfaces

To further illustrate techniques that may be employed to display trust for content elements on an individual basis, consider now a discussion of some user interface examples that are depicted in FIGS. 2-6.

FIG. 2 depicts generally at 200 a diagram depicting an example scenario in which interaction with a user interface may occur to selectively expose trust data for content elements in accordance with one or more implementations. In the depicted example, a representative user interface 120 associated with a communication module 114 as described herein is illustrated. The user interface 120 may include a chrome portion 202 that is representative of an application frame having menus, controls, buttons, and other user interface instrumentalities that provide core functionality of the communication module 114. The chrome portion 202 may include or make use of a content display portion 204 which is configured to enable presentation of composite content that is rendered via the communication module 114. Generally, elements and functionality associated with the chrome portion 202 are under the control of the communication module 114 and are not made accessible to content that is rendered in the content display portion 204. The communication module 114 may implement a trust model in which content elements 122 included as part of content in the content display portion 204 may be provided limited access to functionality of the communication module, applications, operating system, and/or the device hardware.

In accordance with techniques described herein, various kinds of composite content (e.g., web pages, web documents, presentation packages, etc.) that includes a plurality of content elements 122 may be rendered for display via the content display portion 204. The content elements 122 may include one or more media streams that may be associated with web-based real-time communications between clients. Representative content elements 122 shown in FIG. 2 include a video element "A" for video streaming/playback, an audio element "B" for audio streaming/playback, an image element "C" for display of and/or interaction with images, and other elements "D" that may be employed for other kinds of content such as data feeds, blogs, textual content, links, animations, advertisements, applets, and so forth.

A verifier module 118 may be invoked in conjunction with the communication module 114 to enable display of trust data for the plurality of content elements 122 on an individual basis as described above and below. In an implementation, a trust control 206 may be provided to enable access to the trust data. The trust control 206 may be configured in various ways such as being a selectable button (as shown), a menu item, an icon, toolbar option, and so forth. As shown in FIG. 2, interaction 208 with the trust control 206 may cause operation of the control to selectively expose a trust display portion 210. For example, a user may interact to select the trust control using touch or another input mechanism, which causes presentation of trust data for the content elements within a trust display portion 210.

Generally, the trust display portion 210 is designed to arrange and present trust display elements 124 that are configured to represent trust data for corresponding content elements 122. Configuring different trust display elements for each content element 122 for which trust data is available enables representations of and interaction with the trust data for the individual elements rather than just providing a trust assertion for a page or document as whole. Accordingly, user may obtain deeper knowledge regarding the trustworthiness of content elements and may be able to quickly recognize elements that may be suspect. Moreover, the trust display portion 210 may be implemented as a component of the chrome portion 202 as opposed to being an element of content rendered as part of a page/document in the content display portion 204. This makes it difficult or impossible for malicious content to spoof the security assertions that are provide via the trust display portion 210. Accordingly, the communication module 114 has control over the trust display portion 210 which increases security and trustworthiness of information presented via the portion.

In the example of FIG. 2, the trust display portion 210 is configured as pop-out or slide-out window element that appears in response to operation of the trust control 206 (e.g., selecting the example button). Other forms of a trust display portion 210 are also contemplated such as a pop-out window, a security tab element of a tabbed user interface, a dialog box, or a toast notification of a notification bar provided via the user interface, to name a few examples. Some additional details and examples are discussed in relation to the following figures.

Figure 3:
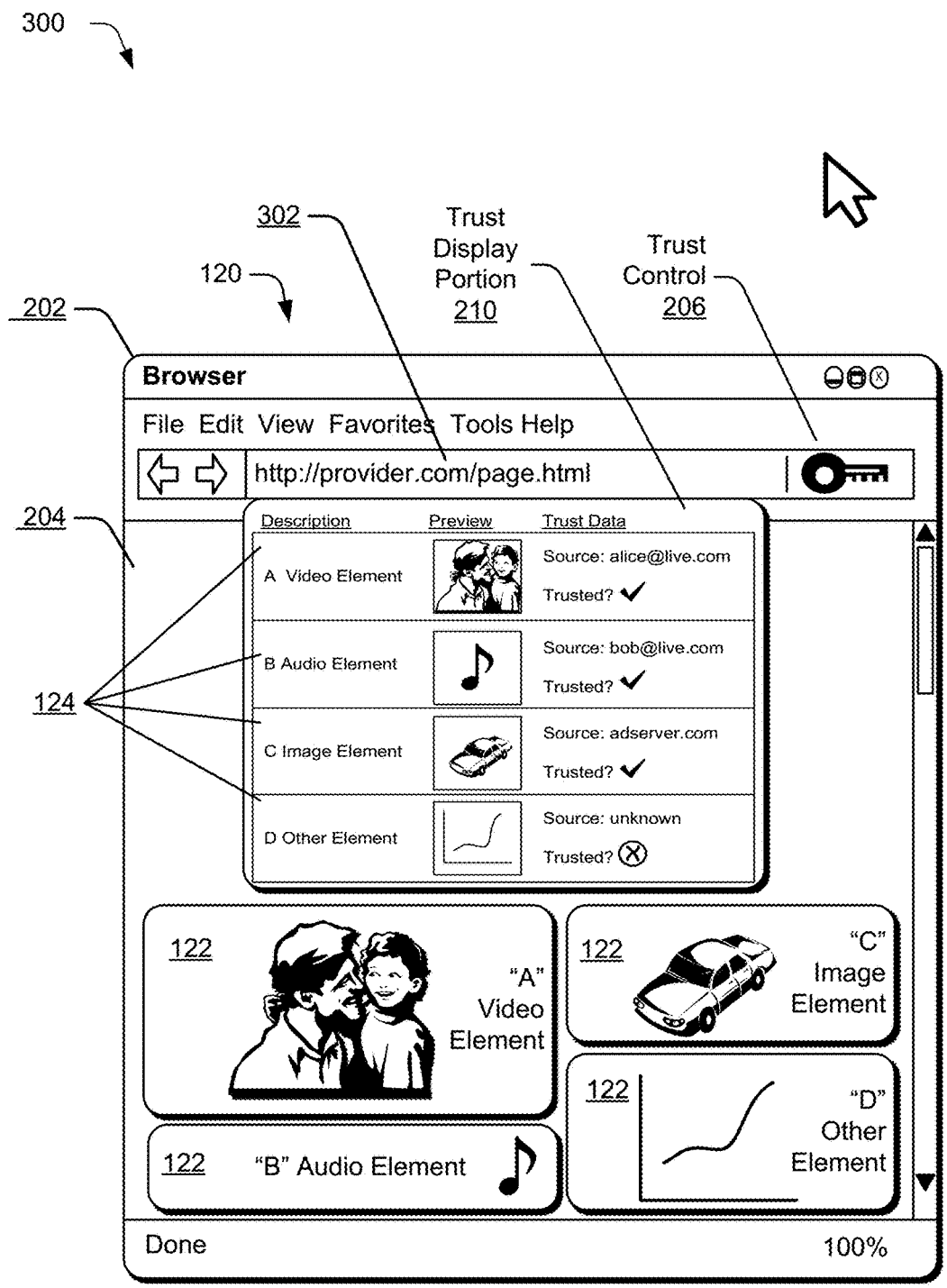
FIG. 3 is a diagram depicting a representation of a user interface in which a trust display portion is exposed in accordance with one or more implementations.

FIG. 3 depicts generally at 300 an illustrative example of a user interface configured to selectively present trust data via a trust display portion 210 in accordance with techniques described herein. In this example, the user interface 120 corresponds to a browser that may be employed to access and render web pages, web documents, and other content. The browser may also enable rendering of media streams 116 for on-line communications including at least web-based real-time communications between clients.

The user interface 120 includes an address bar portion 302 as part of the browser chrome. The address bar portion 302 is configured to enable navigation to access various content items and may represent a URL of a web page/web site to which the browser is directed. A trust control 206 as described previously may be provided to enable selective access to trust data for content elements. In an implementation, the trust control is provided as an integrated component of the address bar portion 302 of the browser, such as the illustrated key icon. In this approach the address bar portion 302 may include a protocol portion to present the URL and facilitate navigation and a security portion which includes the trust control 206 to represent and/or facilitate access to trust data. Alternatively, the security portion and/or trust control 206 may be configured as components of the chrome that are separate from the address bar portion 302.

When the browser is directed to a particular page/content item, the trust control 206 provides access to trust data for that particular page/content item. At least some of the trust data may be obtained based upon digital certificates associated with content elements in accordance with a trust model supported by the browser. For example, selection of the key icon of FIG. 3 may cause display of a corresponding trust display portion 210. The trust display portion 210 may include separate trust display elements 124 for individual content elements contained within a page. The trust display elements 124 may be configured using trust data that is contained within certificates associated with individual elements, embedded as metadata for the elements, or otherwise accessible for use by the browser and/or verifier module 118.

Figure 4:
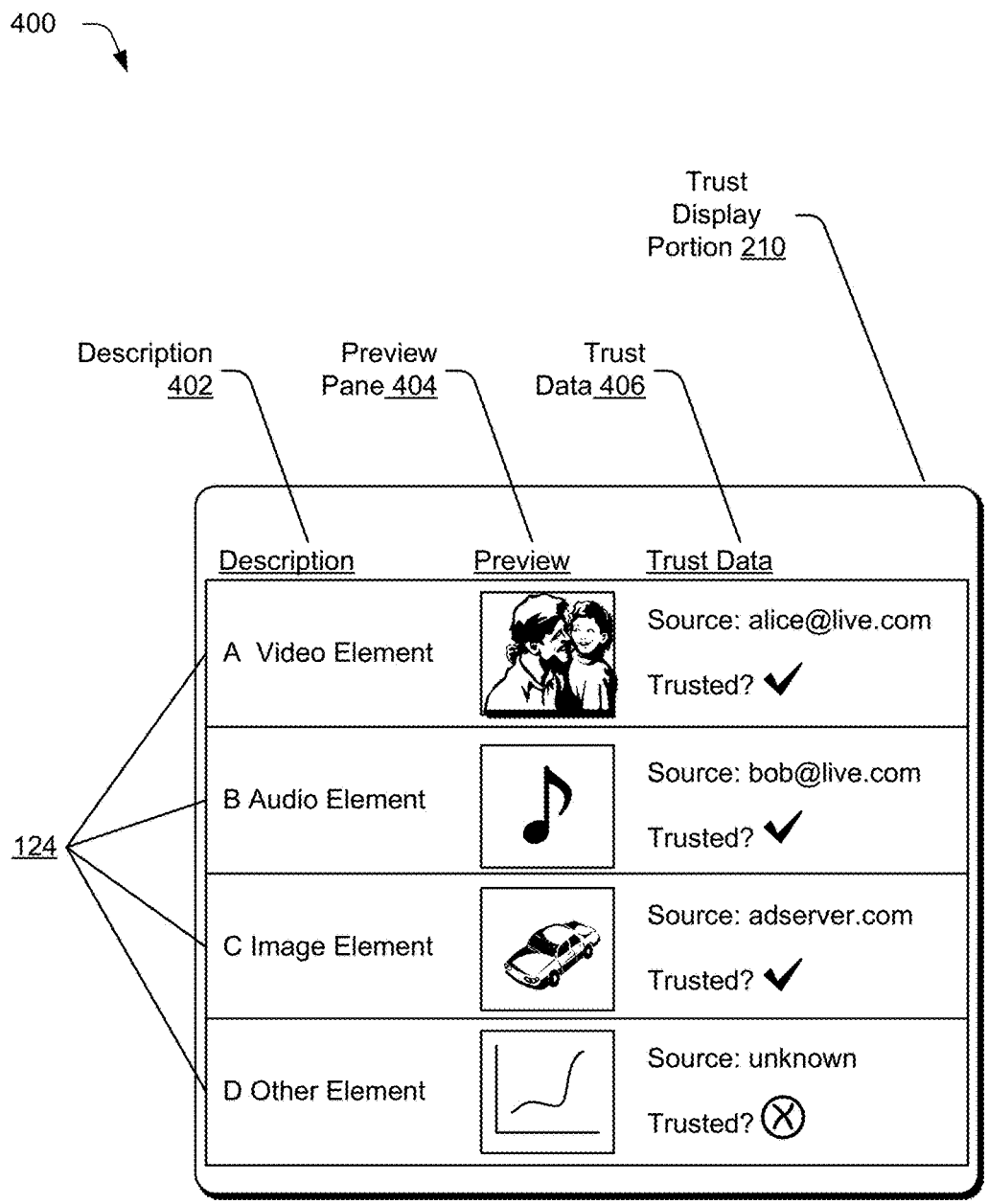
FIG. 4 is a diagram depicting a detailed view of an example trust display portion in accordance with one or more implementations.

Referring to FIG. 4, a detailed view of the example trust display portion 210 of FIG. 3 is shown generally at 400. Here, the trust display portion 210 is configured to include trust display elements 124 for the different content elements rendered via the browser user interface of FIG. 3. In general, each of the trust display elements may be configured to include a description 402, a preview pane 404, and/or a trust data 406 for a corresponding content element 122. Although various arrangements are contemplated, in this example, the trust display elements 124 are arranged generally as a table that includes a row for each content element.

The descriptions 402 may include a name, identifier, and/or other descriptive information regarding content elements. The preview panes 404 represent functionality to provide a visual preview of content. The preview panes may enable a user to quickly recognize the elements for which trust data is being shown and to get at least a sense of where the content is located on a page/document. In the case of hidden streams or elements that do not visually appear on the rendered page, the preview pane may include an indication to notify the user of the hidden content. In the case of images, text boxes, and video streams, the preview pane may show a thumbnail image or full rendition view of content. For hidden content and/or audio content, icons that represent the type of content may be shown in place of the thumbnail, such as showing a musical note icon for the audio element as in FIG. 4. Additionally or alternatively, some preview panes may be configured as live media tiles that provide live streams of content. For example, audio and video preview streams may be rendered via corresponding preview panes 404 in a thumbnail format or as full renditions.

In an implementation, static thumbnails and icons may be shown initially within the trust display portion 210. Then, interaction with individual preview panes may cause a playback of streaming media associated with the selected pane if available. For example, a video snapshot for the video element may be shown in the preview pane 404 in the first row of FIG. 4. Then, if a user clicks on, hovers over, or otherwise interacts with the preview pane in a designated manner, the preview pane may switch to streaming playback view of the video stream in substantially real-time. This technique not only enables a user to preview individual elements and streams, but also enables users to selectively isolate playback of various media streams on an individual basis, additional details of which are discussed in relation to FIG. 6 below.

A variety of different trust data 406 may be associated with content elements and represented via a trust display portion 210. For example, the trust data may include at least an identification of the source of the content and an indication of the level of trust in the source and/or content, examples of which are depicted for the trust display portions 124 in FIG. 4. The indication of trust may be based upon verification of an asserted identity using certificate authentication, a hash algorithm, key-based security, third-party certification, and/or other verification techniques. If a source/identity is authenticated by a third party entity, then name and/or description of the entity that performed the authentication may also be included with trust data 206 and/or displayed via the trust display elements. Further, an indication of a level of trust in accordance with the verification may be presented in association with each element, such as using different icons (checkmark, question mark, "x" icon), labels (trusted, unknown, untrusted), or other suitable indicators. In an implementation, the trust data 406 may further include a representation of a chain of custody for a stream or element through different entities and/or an indication of trust for each entity when applicable.

Figure 5:
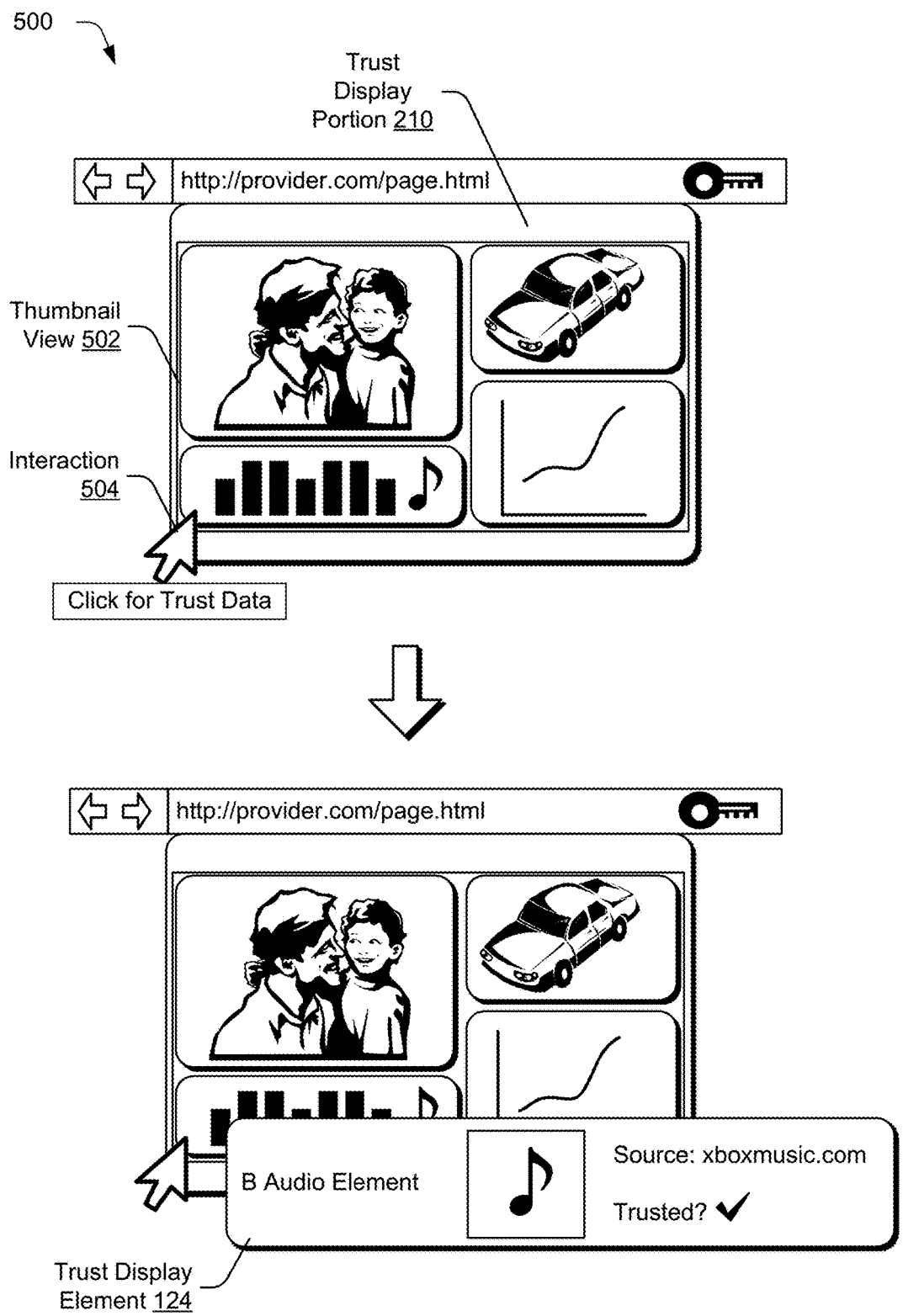
FIG. 5 is a diagram depicting some details of a trust display portion having a thumbnail view of content in accordance with one or more implementations.

FIG. 5 depicts generally at 500 another illustrative example of a trust display portion that may be configured to enable access to trust data for individual content elements. Here, the trust display portion 210 is configured to show a thumbnail view 502 of the composite content that is rendered by a browser (or other communication module 114). Other representation may also be used including icons and/or full rendition views of content. The thumbnail view 502 presents an overview of the entire page or document through which a user may navigate and selectively access trust data for content elements on an individual basis. For example, the thumbnail view 502 may include selectable representations of each content element 122 through which corresponding trust data may be accessible. Interaction 504 with a particular representation of a content element in the thumbnail may cause display of a corresponding trust display element 124 configured for the content element. In an implementation, hovering a cursor over or proximate to a portion of the thumbnail view may cause display of a prompt indicating that trust data is available for an underlying item, such as the "Click for Trust Data" prompt shown in FIG. 5. Now, if the user clicks on the representation or otherwise interacts in a designated way, a corresponding trust display element 124 may be exposed as illustrated in FIG. 5. Therefore, the thumbnail view acts somewhat like a map of the page/document through which a user may navigate and access corresponding trust data for content elements. The thumbnail view may enable selection and display of trust display elements 124 separately for individual content elements 122. In addition or alternatively, a user may be able to toggle selection of one or more elements via the thumbnail view to choose one or multiple elements at the same time. Then, responsive to interaction to access trust data (mouse click, operation of a button, etc.), one or more corresponding trust display element 124 for the selected group of elements may be exposed via the user interface.

Figure 6:
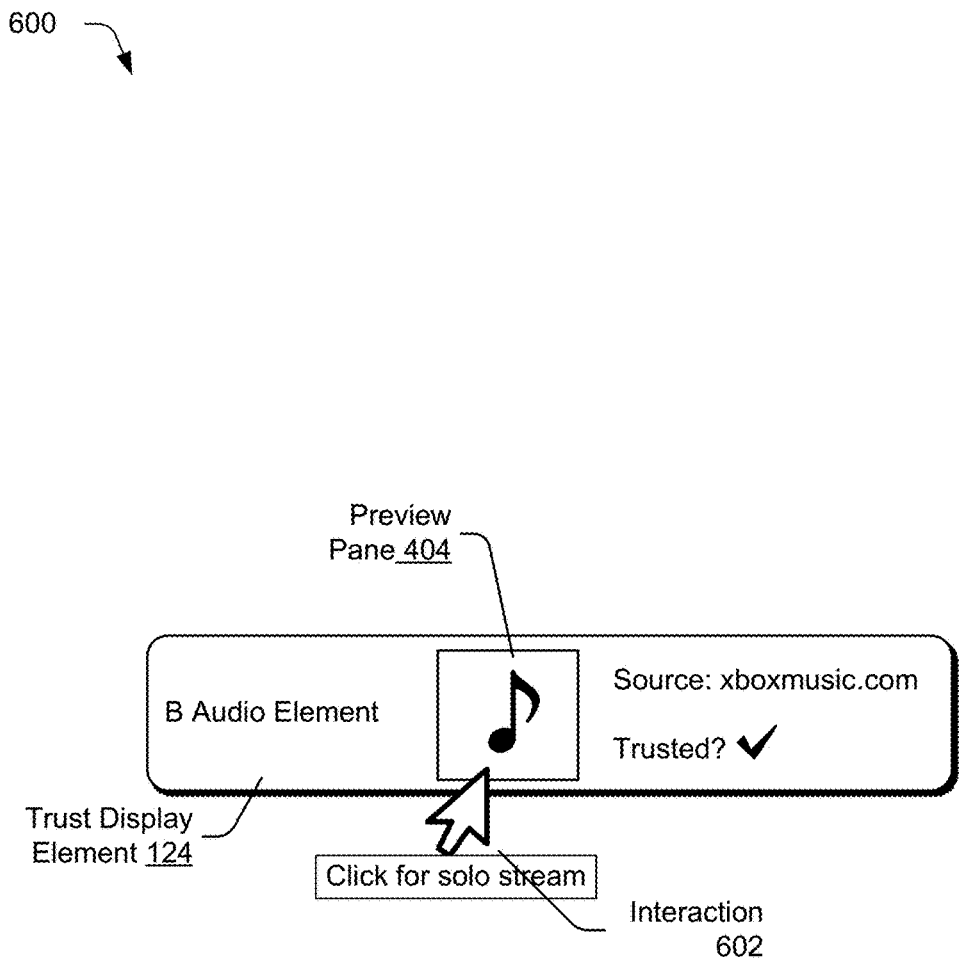
FIG. 6 is a diagram depicting some details of a trust display portion in accordance with one or more implementations.

As mentioned, a trust display portion 210 may support isolation of media streams on an individual basis. This enables a user to preview streams individually. Additionally, isolation may facilitate detection of particular streams, such as determining where an annoying background audio stream may originate from within a render page so that the user may access and/or shut off the stream. A representation of interaction to isolate a stream is shown in FIG. 6, generally at 600. Here, a trust display portion 124 for an audio element is depicted. In this example, interaction 602 with a preview pane 404 for the audio stream enables a user to isolate the stream. In an implementation, hovering over or proximate to the preview pane causes display of a prompt to indicate the stream may be isolated, such as the example "Click for solo stream" prompt shown in FIG. 6. If a user chooses to click on the preview pane, an isolated rendering of raw audio data for the stream may be initiated. Naturally, other controls and/or user interface instrumentalities may be used to selectively isolate streams such as an isolation button, checkboxes or a radio control to toggle media streams on/off, a mixing control that facilitates selection of streams and mixing of one or more selected streams at different output levels, and so forth.

Having considered the foregoing example details and user interfaces, consider now a discussion of the following example procedures for media stream trust display in accordance with one or more implementations.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the examples of FIGS. 2-6. For instance, aspects of the procedures may be performed by a suitably configured computing device, such as a client device that includes or otherwise makes use of a communication module 114 and/or an image verifier module 118. Aspects of the procedures may also be performed by one or more server devices, such as a servers associated with a service provider 106 configured to provide a communication service 128.

Functionality, features, and concepts described in relation to the examples of FIGS. 1-6 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 7:
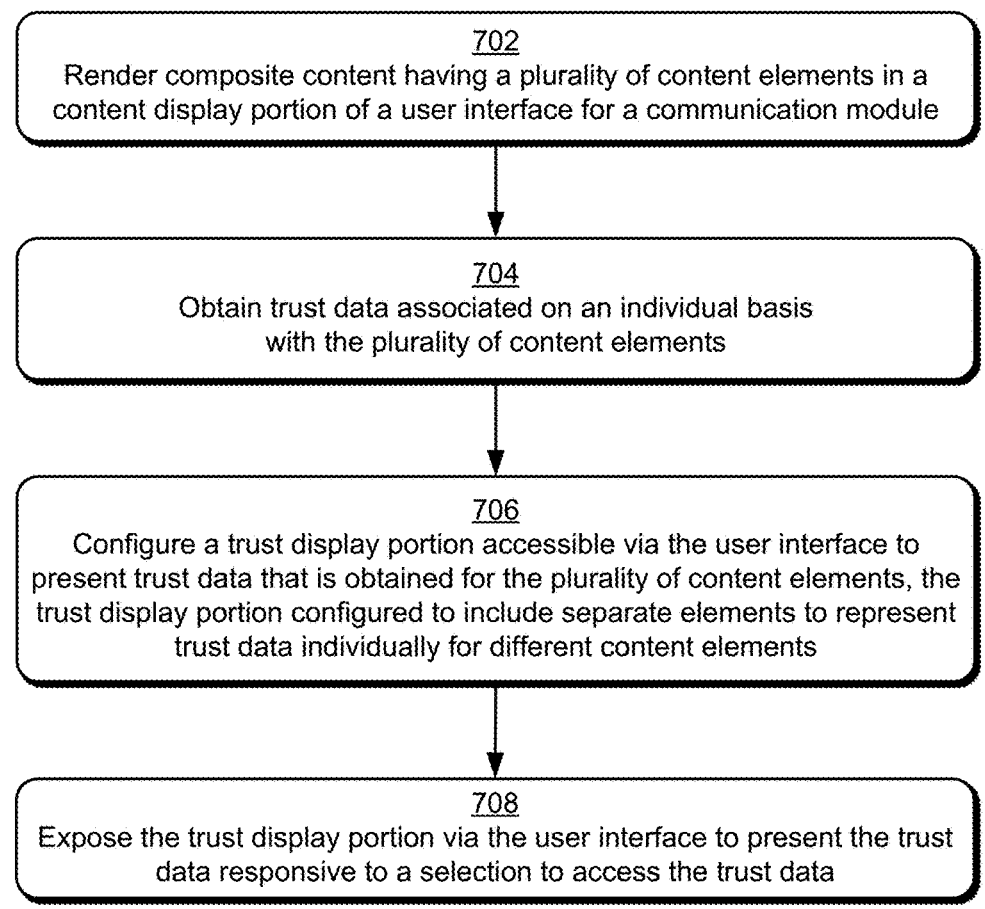
FIG. 7 is a flow diagram depicting an example procedure to display trust for multiple content elements in accordance with one or more implementations.

FIG. 7 is a flow diagram depicting an example procedure 700 to display trust for multiple content elements in accordance with one or more implementations. Composite content having a plurality of content elements is rendered in a content display portion of a user interface for a communication module (block 702). For example, content such as web page may be rendered via a browser or other communication module 114 in connection with a communication session between clients, or between a server and one or more clients. The rendered content may include one or more media streams for the communication session as well as other kinds of content elements 122.

Trust data is obtained that is associated on an individual basis with the plurality of content elements (block 704). For example, a verifier module 118 may be invoked to perform verification of media streams and other content elements as described previously. The verification may occur in accordance with a trust model implemented by or supported by the browser/communication module 114 used to render the content. In an implementation, the verifier module 118 is operable to interact directly with the browser/communication module to obtain trust data that is established based on the trust model. This may involve processing of digital certificates and/or extraction of trust data associated with the content elements via the certificates, as embedded metadata, or otherwise. Thus, to obtain trust data, the verifier module 118 may query a trust model implemented via the browser/communication module to retrieve trust certificates for the different content elements that incorporate the trust data. In addition or alternatively, the verifier module 118 may obtain at least some trust data by querying a server that provides a trust model as a web-based service to retrieve trust certificates for the different content elements that incorporate the trust data.

A trust display portion accessible via the user interface is configured to present trust data that is obtained for the plurality of content elements, the trust display portion configured to include separate elements to represent trust data individually for different content elements (block 706). Then, the trust display portion is exposed via the user interface to present the trust data responsive to a selection to access the trust data (block 708). For example, a trust display portion 210 may be configured to represent trust for multiple content elements in accordance with the examples depicted and described previously in relation to FIGS. 1-6. In particular, a trust display portion 210 may be configured as a table having different rows/display elements for different content elements, such as the examples shown in relation to FIGS. 3 and 4. Alternatively, the trust display portion may be configured to provide a thumbnail view of the rendered composite content that includes representations of each of the plurality of content elements that are selectable via the thumbnail to access trust data for corresponding content elements, such as the example discussed in relation to FIG. 5.

Generally speaking, though, the trust display portion may be configured as any suitable modal or non-modal display element of a user interface that is configured to represent individual trust data for multiple content elements in the same view. To ensure security of the trust data, the trust display portion may be implement as a trusted component of the user interface that is under the control of the communication module/browser. For instance, the trust display portion 210 may be associated with the chrome portion 202 of a browser user interface rather than just representing trust assertions as content items within a content display portion 204 of the browser user interface. Each of the separate elements that is displayed for the content elements is configured to represent corresponding trust data. For example, the separate elements may each be configured to include at least a thumbnail view of a corresponding content element and a representation of the trust data obtained for the corresponding content element. Other trust data, such as a description, an indication of a source of the content, a chain of custody, and so forth, may also be presented.

Figure 8:
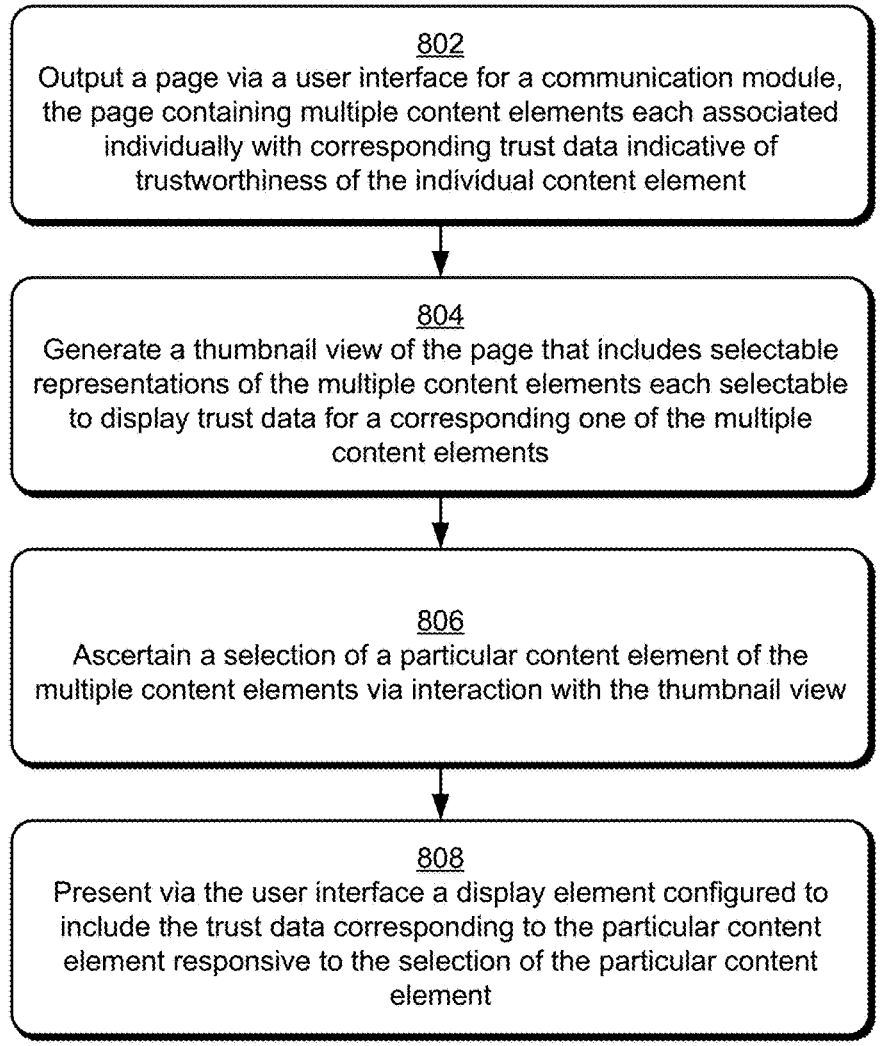
FIG. 8 is a flow diagram depicting an example procedure to provide access to trust data via a thumbnail view of content accordance with one or more implementations.

FIG. 8 is a flow diagram depicting an example procedure 800 to provide access to trust data via a thumbnail view of content in accordance with one or more implementations. In particular, a page is output via a user interface for a communication module, the page containing multiple content elements each associated individually with corresponding trust data indicative of trustworthiness of the individual content element (block 802). For example a web page may be rendered via a communication module 114. The web document may comprises a network accessible page that may be used by a client to engage in a communication session in which various media streams are exchanged. In this scenario, the web page may include content elements corresponding to the various media streams as well as other content, such as images, text, feeds and so forth. Each of the individual content elements may be associated with digital certificates or another suitable form trust data that can be obtained and used by a verifier module 118 to output representations of trust for the media streams and other elements on an individual basis. For example, a page of composite content having multiple individual elements may be rendered via browser, such as the example page depicted in FIG. 3.

In order to provide access to trust data, a thumbnail view of the page is generated that includes selectable representations of the multiple content elements each selectable to display authentication data for a corresponding one of the multiple content elements (block 804). The thumbnail view provides a map of the page through which trust data for individual elements may be accessed as discussed in relation to the example of FIG. 5. Accordingly, a user may be able to select one or more individual elements through interaction with the thumbnail view and selectively display trust data for one or more selected elements at a time.

In one or more implementations, the thumbnail view is configured as an unmodified version of the page is derived from unmodified stream data. In general, the page representations as well as preview views of individual streams/items described herein may be shown in a raw format without reflecting application of some or all client-side compositing or data manipulations. For instance, client-side color corrections, special effects, layout manipulations, and/or other operations performed by a browser to present a page may be selectively omitted when thumbnail maps, thumbnail previews, and/or other kinds of preview panes described throughout this document are created. As such, the various kinds of content shown in preview panes may be presented without showing the effects of at least some selected client-side processing operations.

In particular, a selection is ascertained of a particular content element of the multiple content elements via interaction with the thumbnail view (block 806) and a display element is presented via the user interface that is configured to include the trust data corresponding to the particular content element responsive to the selection of the particular content element (block 808). For example, the verifier module 118 may monitor interaction with the thumbnail view to detect when a user selects one or more of the represented elements. Then, responsive to the selection, the verifier module 118 may initiate retrieval and presentation of one or more corresponding trust display elements. Thus, if a particular video element is selected via the thumbnail view, a pop-up window, dialog, slide-out element, or other user interface instrumentality may be exposed to present trust data for the particular video element. A user may then decide to select a different element. In response to selection of the different element, corresponding trust data may be presented in a comparable manner to presentation of the data for the video element. This may occur with or without closing the view of trust data for the video element. Thus, in some instances, multiple individual trust display elements may appear in the user interface at the same time. In other words, the thumbnail view may enable both sequential display of trust data for different elements and simultaneous display of trust data for multiple elements.

Having considered some example procedures, consider now a discussion of an example system and devices that may be employed to implement aspects of the techniques described herein in one or more implementations.

Example System and Device

Figure 9:
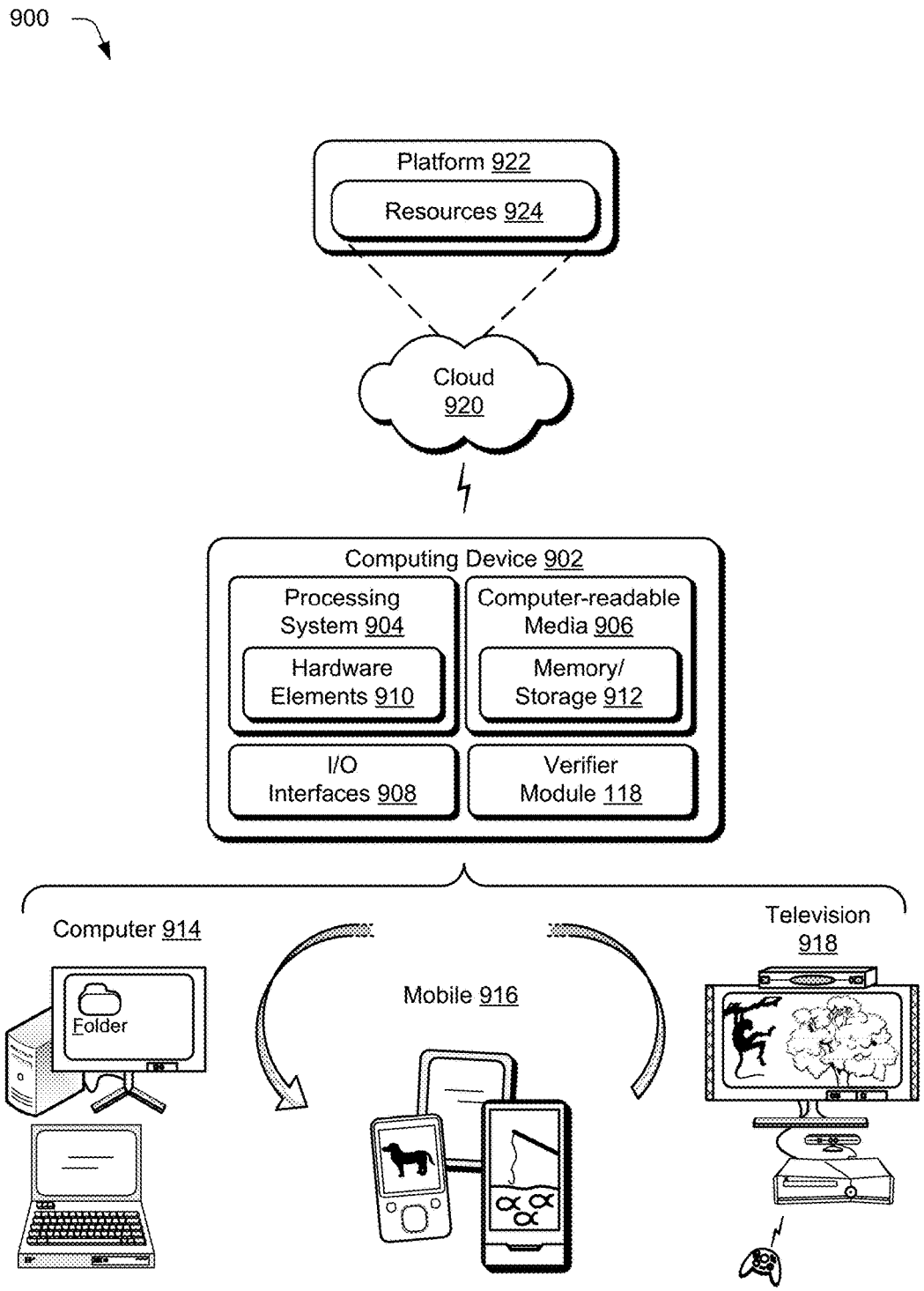
FIG. 9 illustrates an example system having devices and components that may be employed to implement aspects of the techniques described herein.

FIG. 9 illustrates an example system generally at 900 that includes an example computing device 902 that is representative of one or more computing systems and/or devices that may implement the various techniques described herein. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 902, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including applications 112, communication module 114, verifier module 118, communication service 128 and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This is illustrated through inclusion of the verifier module 118 on the computing device 902. The functionality of the verifier module 118 and other modules may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. One or more computer-readable storage media comprising instructions that, when executed by a client device, implement a communication module configured to perform operations comprising:
   outputting a page via a user interface for the communication module, the page containing multiple content elements each associated individually with corresponding trust data indicative of trustworthiness of the individual content element;
   generating a thumbnail image of the page that include selectable representations of the multiple content elements each selectable to display trust data for a corresponding one of the multiple content elements;
   ascertaining a selection of a particular content element of the multiple content elements via interaction with the thumbnail image; and
   presenting via the user interface a display element configured to include the trust data corresponding to the particular content element responsive to the selection of the particular content element.

2. One or more computer-readable storage media of claim 1, wherein the communication module is configured to provide integrated functionality for web browsing, user presence indications, video communications, online collaboration and meeting experiences, instant messaging, and voice calling.

3. One or more computer-readable storage media of claim 1, wherein the display element corresponding to the particular content element includes a control operable to isolate a media stream associated with the particular content element from other media streams contained in the page.

4. One or more computer-readable storage media of claim 1, wherein the communication module comprises a browser.

5. One or more computer-readable storage media of claim 1, wherein the communication module is configured to enable a communication session between clients over the Internet.

6. One or more computer-readable storage media of claim 5, wherein the communication session comprises a web-based real time communication session that supports the exchange of real-time audio and video streams between the clients.

7. One or more computer-readable storage media of claim 1, wherein the page comprises a web page.

8. A computing device comprising:
a processing system; and
one or more computer readable media storing instructions that, when executed by the processing system, implement a communication module to perform operations comprising:
outputting a page via a user interface for the communication module, the page containing multiple content elements each associated individually with corresponding trust data indicative of trustworthiness of the individual content element;
generating a thumbnail image of the page that include selectable representations of the multiple content elements each selectable to display trust data for a corresponding one of the multiple content elements;
ascertaining a selection of a particular content element of the multiple content elements via interaction with the thumbnail image; and
presenting via the user interface a display element configured to include the trust data corresponding to the particular content element responsive to the selection of the particular content element.

9. The computing device of claim 8, wherein the communication module is configured to provide integrated functionality for web browsing, user presence indications, video communications, online collaboration and meeting experiences, instant messaging, and voice calling.

10. The computing device of claim 8, wherein the display element corresponding to the particular content element includes a control operable to isolate a media stream associated with the particular content element from other media streams contained in the page.

11. The computing device of claim 8, wherein the communication module comprises a browser.

12. The computing device of claim 8, wherein the communication module is configured to enable a communication session between clients over the Internet.

13. The computing device of claim 12, wherein the communication session comprises a web-based real time communication session that supports the exchange of real-time audio and video streams between the clients.

14. The computing device of claim 8, wherein the page comprises a web page.

15. A method implemented by a computing device comprising:
outputting a page via a user interface for a communication module, the page containing multiple content elements each associated individually with corresponding trust data indicative of trustworthiness of the individual content element;
generating a thumbnail image of the page that include selectable representations of the multiple content elements each selectable to display trust data for a corresponding one of the multiple content elements;
ascertaining a selection of a particular content element of the multiple content elements via interaction with the thumbnail image; and
presenting via the user interface a display element configured to include the trust data corresponding to the particular content element responsive to the selection of the particular content element.

16. The method of claim 15, wherein the communication module is configured to provide integrated functionality for web browsing, user presence indications, video communications, online collaboration and meeting experiences, instant messaging, and voice calling.

17. The method of claim 15, wherein the display element corresponding to the particular content element includes a control operable to isolate a media stream associated with the particular content element from other media streams contained in the page.

18. The method of claim 15, wherein the communication module comprises a browser.

19. The method of claim 15, wherein the communication module is configured to enable a communication session between clients over the Internet.

20. The method of claim 19, wherein the communication session comprises a web-based real time communication session that supports the exchange of real-time audio and video streams between the clients.

* * * * *